US010000598B2

(12) United States Patent
Belbruno

(10) Patent No.: US 10,000,598 B2
(45) Date of Patent: Jun. 19, 2018

(54) METHODS FOR PREPARATION OF MOLECULARLY IMPRINTED POLYMERS FOR WINE EXTRACTION

(71) Applicant: The Trustees of Dartmouth College, Hanover, NH (US)

(72) Inventor: Joseph J. Belbruno, Hanover, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 112 days.

(21) Appl. No.: 14/435,995

(22) PCT Filed: Oct. 15, 2013

(86) PCT No.: PCT/US2013/064973
§ 371 (c)(1),
(2) Date: Apr. 15, 2015

(87) PCT Pub. No.: WO2014/062632
PCT Pub. Date: Apr. 24, 2014

(65) Prior Publication Data
US 2015/0232598 A1    Aug. 20, 2015

Related U.S. Application Data

(60) Provisional application No. 61/713,948, filed on Oct. 15, 2012, provisional application No. 61/842,705, filed on Jul. 3, 2013.

(51) Int. Cl.
C08F 222/10 (2006.01)
C08F 8/30 (2006.01)
C12H 1/056 (2006.01)

(52) U.S. Cl.
CPC ......... *C08F 222/10* (2013.01); *C12H 1/0424* (2013.01); *Y10T 428/2982* (2015.01)

(58) Field of Classification Search
USPC .............................................. 526/263; 435/4
See application file for complete search history.

(56) References Cited

U.S. PATENT DOCUMENTS

| | | | |
|---|---|---|---|
| 4,008,339 A | 2/1977 | Matsuda et al. | |
| 4,594,250 A | 6/1986 | Lautenschlaeger | |
| 4,834,998 A | 5/1989 | Shrikhande | |
| 5,510,125 A | 4/1996 | Gresch | |
| 6,127,154 A | 10/2000 | Mosbach et al. | |
| 8,883,239 B2 | 11/2014 | Silva Santos et al. | |
| 2002/0012727 A1 | 1/2002 | Leone | |
| 2006/0102556 A1 | 5/2006 | Sergey et al. | |
| 2006/0292545 A1* | 12/2006 | Sellergren | B01J 20/26 435/4 |
| 2008/0264868 A1 | 10/2008 | Murray et al. | |
| 2009/0035431 A1 | 2/2009 | Ebert | |
| 2009/0281272 A1 | 11/2009 | Yilmaz et al. | |
| 2010/0039124 A1 | 2/2010 | Belbruno et al. | |
| 2010/0068820 A1 | 3/2010 | Meathrel et al. | |
| 2010/0105076 A1* | 4/2010 | Perollier | B01J 20/26 435/7.4 |
| 2012/0196024 A1* | 8/2012 | Kelm | A23L 2/80 426/592 |
| 2012/0214897 A1* | 8/2012 | Yiannikouris | B01J 20/26 522/167 |
| 2012/0291793 A1 | 11/2012 | Byrd et al. | |
| 2014/0220706 A1 | 8/2014 | Belbruno | |
| 2014/0227795 A1 | 8/2014 | Belbruno | |
| 2014/0242237 A1* | 8/2014 | Belbruno | C08L 33/12 426/422 |
| 2014/0242601 A1 | 8/2014 | Belbruno | |

FOREIGN PATENT DOCUMENTS

| | | |
|---|---|---|
| EP | 1790714 A1 | 5/2007 |
| GB | 2332529 A | 6/1999 |
| WO | 2004067578 A1 | 8/2004 |
| WO | 2010118523 A1 | 10/2010 |
| WO | 2012106265 A1 | 8/2012 |
| WO | 2014-062632 A1 | 4/2014 |

OTHER PUBLICATIONS

Chapman (2004) "Yield Effects on 2-Methoxy-3-Isobutylpyrazine Concentration in Cabernet Sauvignon Using a Sold Phase Microextraction Gas Chromatography/Mass Spectrometry Method," J. Agric. Food Chem. 52:5431-5435.*
Baggiani et al. (2007) "Molecularly imprinted solid-phase extraction method for the high-performance liquid in wine," J. Chromatography 1141(2):158-164.
BelBruno (2009) "Molecularly Imprinted Polymers: Artificial Receptors with Wide-Ranging Applications," Micro and Nanosystems. 1:163.
BelBruno et al. (Feb. 2, 2011) "Capacitive sensing of amino acids in molecularly imprinted nylon films," Sensors and Actuators B. 155(2):915-918.
Blahova et al. (2004) "The use of molecularly imprinted polymer for selective extraction of (+) 1 catechin," J. Liquid Chromatography and Related Technologies. 27(17):2715-2731.
Cacho et al. (2003) "Clean-up of triazines in vegetable extracts by molecularly-imprinted propazine-imprinted polymer," Anal. Bioannal. Chem. 376:491-496.
Campbell et al. (2009) "Surface Morphology of Spin-Coated Molecularly Imprinted Polymer Films," Surf. Interface Anal. 41:347-356.
Chapman et al. (2004) "Sensory Attributes of Cabernet Sauvignon Wines Made from Vines with Different Crop Yields," Am. J. Enol. Vitic. 55:325-334.
Chapuis et al. (2004) "Retention mechanism of analytes in the solid-phase extraction process using molecularly imprinted polymers Application to the extraction of triazines from complex matrices," J. Chromatography B. 804 (1):93-101.

(Continued)

*Primary Examiner* — Mark Kaucher
*Assistant Examiner* — Henry Hu
(74) *Attorney, Agent, or Firm* — Lathrop Gage LLP

(57) ABSTRACT

Disclosed herein are compositions of, synthesis methods and methods of use for improved molecularly imprinted polymers useful for extracting target molecule compounds of wine.

15 Claims, No Drawings

(56) References Cited

OTHER PUBLICATIONS

Dela Cruz et al. (1999) "Molecular Imprinting of Methyl Pyrazines," Analytical Letters. 32(5):841-854.
Dirion et al. (2003) "Water-Compatible Molecularly Imprinted Polymers Obtained via High-Throughput Synthesis and Experimental Design," J. Am. Chem. Soc. 125(49):15101-15109.
Garde-Cerdan et al. (2008) "Molecularly Imprinted Polymer-Assisted Simple Clean-Up of 2,4,6-Trichloroanisole and Ethylphenols from Aged Red Wines," Am. J. Enology. Viticulture. 59(4):396-400 (2008).
Hashizume et al. (1999) "Grape maturity and light exposure affect berry methoxypyrazine concentration," American J. Enology and Viticulture. 50(2):194-198.
PCT Application No. PCT/US2013/064973 International Search Report dated Jan. 16, 2014, 4 pages.
PCT Application No. PCT/US2012/023186 International Search Report with Written Opinion dated Mar. 28, 2012, 9 pages.
PCT Application No. PCT/US2012/060248 International Search Report with Written Opinion dated Mar. 25, 2013, 10 pages.
PCT Application No. PCT/US2013/064973 International Search Report with Written Opinion dated Jan. 16, 2014, 13 pages.
Kotseridis et al. (1998) "Synthesis of labelled [2H4]β-damascenone, [2H2]2-methoxy-3-isobutylpyrazine, [2H3]α-ionone, and [2H3]β-ionone, for quantification in grapes, juices and wines," J. Chromatogr. A. 824:71-78.
Kotseridis et al. (1999) "Quantitative Determination of 2-meth-oxy-3-isobutylpyrazine in Red Wines and Grapes of Bordeaux Using a Stable Isotope Dilution Assay," J. Chromatogr. A. 841:229-237.
Lele et al. (1999) "Molecularly imprinted polymer mimics of chymotrypsin: 1. Cooperative effects and substrate specificity," Reactive and Functional Polymers. 39(1):37-52.
Lin et al. (2003) "Molecularly imprinted polymeric beads for decaffeination," J. Medical and Biological Engineering. 23(2):53-56.
Maier et al. (2004) "Molecularly imprinted polymer-assisted sample clean-up of merits and limitations," J. Chromatography B. 804:103-111.
Molinelli et al. (2002) "Advanced solid phase extraction using molecularly imprinted polymers for the determination of quercetin in red wine," J. Agric. Food Chem. 50:1804-1808.
Mosbach et al. (1996) "The Emerging Technique of Molecular Imprinting and its Future Impact on Biotechnology," Nat. Biotechnol. 14:163-170.
Pap et al. (2004) "Binding assays with molecularly imprinted polymers—Why do they work?" Journal of Chromatography B. 804:167-172.
Polaskova et al. (2008) "Wine flavor: chemistry in a glass," Chem. Soc. Rev. 37:2478-2489.
Richter et al. (2006) "Processing and Morphology of Molecularly Imprinted Nylon Thin Films," J. Appl. Polym. Sci. 101:2919-2926.
Schneider (2010) "Aromatic and Phenolic Ripeness," Communication to the Pennsylvania Quality Association. Schneider-Oenologie. Germany, 1-8.
Shea (1994) "Molecular imprinting of synthetic network polymers: The de novo synthesis of macromolecular binding and catalytic sites," Trends Polym. Sci. 2:166, 8 pages.
Sigma-Aldrich (1998) "Guide to Solid Phase Extraction," Sigma-Aldrich. Bulletin 910, 12 pages.
Sneshkoff et al. (2002) "An Improved Molecularly Imprinted Polymer Film for Recognition of Amino Acids," J. Appl. Polym. Sci. 86:3611-3615.
Tasselli et al. (2008) "Evaluation of molecularly imprinted membranes based on different acrylic copolymers," J. Membrane Science. 320(1-2):167-172.
Tse et al. (2010) "Molecularly imprinted polymers: synthetic receptors in bioanalysis," Analytical and Bioanalytical Chemistry. 398(6):2481-2492.
Wei et al. (2006) "Molecularly imprinted solid phase extraction in a syringe needle packed with polypyrrole-encapsulated carbon nanotubes for determination of ochratoxin A in red wine," Food Sci. Tech. Int. 13(5):375-380.
Weiss et al. (2002) "Molecular Imprinting and Solid Phase Extraction of Flavonoid Compounds," Bioseparation. 10:379-387.
Winetech Scan Research Outputs (2009), from www.winetech.co.za/scan/WinetechScanFebruary2009.pdf, 1 page.
Wulff (1995) "Molecular Imprinting in Crosslinked Materials with the Aid of Molecular Templates—A Way Towards Artificial Antibodies," Angew. Chem. Int. Ed. 34:1812-1832.
Ye et al. (2008) "Molecular imprinting: synthetic materials as substitutes for biological antibodies and receptors," Chem. Mater. 20:859-868.

* cited by examiner

METHODS FOR PREPARATION OF MOLECULARLY IMPRINTED POLYMERS FOR WINE EXTRACTION

CROSS-REFERENCE TO RELATED APPLICATIONS

This application is a U.S. national phase application of International Application No. PCT/US2013/64973, filed on Oct. 15, 2013, which claims the benefit of U.S. Provisional Applications 61/713,948, filed Oct. 15, 2012 and 61/842,705, filed Jul. 3, 2013, all of which are hereby incorporated by reference to the extent not inconsistent with the disclosure herein.

BACKGROUND

The complex flavor and nose of wine results from the presence of a wide range of organic molecules (P. Palaskova, J. Herszage and S. E. Ebeler, "Wine Flavor: Chemistry in a Glass", Chem. Soc. Rev., 37, 2478 (2008); V. Schneider, "Aromatic and Phenolic Ripeness", Schneider-Oenologie, Germany). Not all of these organic molecules are desirable, at least not above a very critical concentration, in the finished product. While the components may, for the most part, be identified using highly sensitive analytical tools, the extraction of a single component of this mixture is difficult since the traditional liquid-liquid or solid phase extraction (SPE) materials and procedures will remove a broad spectrum of organics and could easily modify the characteristics of the wine.

SUMMARY

In one aspect, the present invention provides methods for producing cross-linked molecularly imprinted polymers (MIPs), the MIPs being imprinted with target molecules or target molecule analogs. Using the in-situ MIP production process disclosed herein, the molecularly imprinted polymers produced can have improved properties over MIPs produced by previously disclosed techniques such as phase inversion MIP production processes and the monomer synthesized MIP production processes (without crosslinking agent). The MIPs produced herein are especially useful for removing target molecules from wine, but are also useful for various other applications. The MIPs produced by the processes disclosed herein can be tailored to extract or sense various target molecules and are not limited to target molecules in wine.

In an embodiment, MIPs may be prepared by forming a first solution of a monomer, a target molecule or target molecule analog, and a crosslinker. The first solution is then stirred for a period of time, such as 5 to 18 hours, 5 to 15 hours, 5 to 12 hours or 5 to 10 hours. A polymerization initiator is then added to the first solution and the MIP formed upon activation of the initiator. The MIP is formed through polymerization of the monomer and the crosslinker; the target molecule or target molecule analog are typically associated with the polymer in such a way to imprint the polymer. For example, the monomer and crosslinker may polymerize around the target molecule. The MIP may then be recovered and treated to remove at least some of the target molecule or target molecule analog, such as by washing with a solvent. Removal of the target molecule or target molecule analog can produce a cavity which is complementary in shape and/or functionality to the target molecule In another embodiment, crosslinked MIPs may be prepared by first adding a monomer and a target molecule to a first solvent and stirring to form a first solution. After stirring, a crosslinker is added to the first solution to form a second solution. After additional stirring for some period of time, such as 5 to 18 hours, 5 to 15 hours, 5 to 12 hours or 5 to 10 hours, a polymerization initiator is added to the second solution to form a third solution. The MIP is formed through polymerization of the monomer and the crosslinker upon activation of the initiator; the target molecule or target molecule analog are typically associated with the polymer in such a way to imprint the polymer. The solid MIP is then recovered or isolated from the third solution and may be treated to remove at least some of the target molecule or target molecule analog from the MIP. For example, the MIP washed with a suitable solvent to remove the target molecule from the MIP.

In the methods of the invention described herein for preparation of crosslinked MIPs, the solvent of the first solution may be a polar protic solvent other than water. Suitable polar protic solvents include, but are not limited to, alcohols such as methanol. The monomer of the first solution may be N-vinyl pyrrolidone (NVP) or hydroxyethylemethacrylate (HEMA). The crosslinking molecule may be a difunctional molecule such as a diacrylate or dimethacrylate. Exemplary diacrylates include, but are not limited to, ethylene glycol diacrylate, diethylene glycol acrylate or triethylene glycol diacrylate. Exemplary diamethacrylates include, but are not limited to, ethylene glycol dimethacrylate (EGDMA), diethylene glycol dimethacrylate (DEGDMA) or triethylene glycol dimethacrylate (TEGDMA). The molar ratio of difunctional crosslinker to monomer may be from 1.5:1 to 6:1, 1.5:1 to 5:1 or 1.5:1 to 4:1. In an embodiment, the molar ratio of difunctional crosslinker to n-vinyl pyrrolidone may be from 1.5:1 to 6:1, 1.5:1 to 5:1 or 1.5:1 to 4:1. The weight ratio of crosslinker to n-vinyl pyrrolidone may be from 3:1 to 10:1 or from 5:1 to 7.5:1. In an embodiment, the weight ratio of crosslinker to hydroxyethylmethacrylate (HEMA) is from 3:1 to 10:1 or 5:1 to 7.5:1. In another embodiment, the molar ratio of difunctional crosslinker to HEMA is from 1.5:1 to 6:1, 1.5:1 to 5:1. The target molecules can include 2-isobutyl-3-methoxypyrazine (IBMP), 2-methoxypyrazine, 2-phenylethyl alcohol, guaiacol, or 4-methylguaiacol. In an embodiment, the second solution is stirred for at least 1 hour, at least 2 hours, at least 3 hours, at least 4 hours, at least 5 hours, at least 10 hours, at least 11 hours, at least 12 hours, at least 13 hours, 5 to 18 hours, 5 to 15 hours, 5 to 12 hours, 5 to 10 hours or 12 to 18 hours prior to addition of the initiator. The initiator may be a dialkyldiazene such as AIBN. In an embodiment, the initiator may be activated by heating to a temperature above room temperature, such as to 50-70° C. After addition of the initiator, the solution may be purged with an inert gas such as nitrogen. The solvent used to remove the target molecule or target molecule analog may be a mixture of an alcohol and water. The MIP may be washed with the solvent until analysis of the wash solution shows no detectable amount of target molecule or target molecule analog; analysis of the wash solution may be performed with gas chromatography-mass spectrometry. The wash solvent may comprise from 50 vol % solvent to 100 vol % alcohol; the alcohol may be methanol or ethanol. The MIPs produced herein may be in the form of films and powders. For example, the resulting MIP is a powder that is suitable for use in the solid phase extraction (SPE) of a target molecule from wine. This improved method for making MIPs is herein referred to as an "in-situ production process" and produces robust, rechargeable MIPs. In an embodiment, the MIPs can be recharged at least 5 times, at least 10 times, or at least 15 times.

In another aspect, the invention provides cross-linked molecularly imprinted polymers (MIPs). The inventive crosslinked molecularly imprinted polymers (MIP) may comprise polyvinylpolypyrrolidone (PVPP) or poly(hydroxyethylmethacrylate) (pHEMA). The crosslinked MIPs may be imprinted with a target molecule or target molecule analog selected from 2-isobutyl-3-methoxypyrazine, 2-methoxypyrazine, 2-phenylethyl alcohol, guaiacol, or 4-methylguaiacol. The crosslinked MIPs may be made by polymerization of an n-vinyl pyrrolidone or hydroxyethylmethacrylate monomer with a crosslinking agent. The crosslinking molecule may be selected so that is soluble in the same solvent as the monomer. The crosslinking molecule may be a difunctional molecule such as a diacrylate or dimethacrylate. Exemplary diacrylates include, but are not limited to, ethylene glycol diacrylate, diethylene glycol acrylate or triethylene glycol diacrylate. Exemplary diamethacrylates include, but are not limited to, ethylene glycol dimethacrylate (EGDMA), diethylene glycol dimethacrylate (DEGDMA) or triethylene glycol dimethacrylate (TEGDMA). The molar ratio to difunctional crosslinker to monomer may be from 1.5:1 to 6:1 or 1.5:1 to 5:1. In an embodiment, the MIP is in the form of particles. The average size of the particles may be from 500 nm to 50 μm, 500 nm to 1 μm or from 100 nm to 500 nm. The particles may be homogeneous in size and/or appearance. The inventive crosslinked MIPS may be used for extraction of at least one target molecule component of wine. One g of the MIP may remove 60-100%, 70-100%, 80-100% or 90-100% of the target molecule from 100 ml of wine or synthetic wine containing 20 ng/L of the target molecule.

In an embodiment, the MIP can be a polyvinylpolypyrrolidone (PVPP) or crosslinked vinyl pyrrolidone-based polymer. In an embodiment, the MIP is formed by polymerization of N-vinyl pyrrolidone with a crosslinking monomer. The crosslinking molecule may be ethylene glycol dimethacrylate (EGDMA). In an embodiment the weight ratio of crosslinker to n-vinyl pyrrolidone is from 3:1 to 10:1 or from 5:1 to 7.5:1. In another embodiment, the molar ratio of difunctional crosslinker to n-vinyl pyrrolidone is from 1.5:1 to 6:1, 1.5:1 to 5:1 or 1.5:1 to 4:1. In an embodiment, the PVPP is in the form of particles. The average size of the particles may be from 500 nm to 50 μm, 500 nm to 1 μm or from 100 nm to 500 nm. In an embodiment, the particles appear smooth and non-porous to the eye.

In another embodiment, the MIP can be formed by the polymerization of hydroxyethylmethacrylate with a crosslinking molecule. The crosslinking molecule may be ethylene glycol dimethacrylate. In an embodiment the weight ratio of crosslinker to hydroxyethylmethacrylate (HEMA) is from 3:1 to 10:1 or 5:1 to 7.5:1. In another embodiment, the molar ratio of difunctional crosslinker to HEMA is from 1.5:1 to 6:1 or 1.5:1 to 5:1. In an embodiment, the HEMA based MIP is in the form of particles. The average size of the particles may be from 500 nm to 50 μm, 500 nm to 1 μm or from 100 nm to 500 nm. The HEMA based particles may be non-spherical and need not be smooth in appearance.

The invention also provides crosslinked MIPs prepared by the methods of the invention. Potential candidates for MIP polymers are those polymers that chemically interact with a target molecule or allow formation of shape recognition cavities. These MIP polymers (sometimes called polymer hosts) include, but are not limited to, at least one of polyurethane (PU), poly(4-vinylphenol) (P4VP), or poly (methylmethacrylate) (PMMA), poly(vinylpolypyrrolidone) (PVPP), poly(hydroxyethylmethacrylate) (pHEMA), or co-polymers thereof. In a preferred embodiment, N-vinylpyrrolidone (NVP) or hydroxyethyl methacrylate (HEMA) are monomers used to polymerize to form the polymer of the MIP. In an even more preferred embodiment, NVP is the monomer used to polymerize to form the polymer of the MIP. It will be appreciated by those skilled in the art that the modification of polymers and/or solvents allows for tuning the process of producing MIPs to the chemistry of a target molecule.

In another aspect, the invention provides non-cross-linked molecularly imprinted polymers (MIPs) based on vinylidene chloride and methods for their production. The vinylidene-chloride based MIPs may be imprinted with target molecules or target molecule analogs such as guaiacol, 4-methylguaiacol or IBMP. The MIP may be ground to produce MIP particles of the desired size. In other aspects, the vinylidene chloride monomer may be combined with an acrylate and/or methacrylate monomer.

The molecularly imprinted polymer materials described above are both highly specific and very effective. They may be targeted to a single molecule and reject binding, in a significant way, to any other molecule. For example, the 2-isobutyl-3-methoxypyrazine molecule was found to be a good candidate for a hydrogen bonding and cavity shape imprinted polymer material. The three potential hydrogen-binding sites on this molecule offer a significant chemical component to the specificity of the MIP. Alternatively, a proxy template, related to the true template molecule chemically or in shape such as 2-methoxypyrazine, may be substituted for the true template. Guaiacol can also allow for hydrogen bonding interaction with the MIP.

In another aspect, the invention provides a method for extraction of target molecule from wine. The method may comprise the step of flowing wine through a solid phase extraction column comprising a solid phase comprising any of the inventive MIPs described herein. The method may further comprise the step of collecting the wine after it exits the solid phase extraction column. The wine may comprise an initial concentration of a target molecule as it enters the solid phase extraction column, a final concentration of a target molecule as it exits the solid phase extraction column, and the ratio of the final concentration to the initial concentration of the target molecule may be from 0 to 0.4. or 0 to 0.2.

In yet another aspect, the invention provides a method of regenerating an MIP, the method comprising the step of washing any of the inventive MIPs described herein with a solvent. The solvent may comprise a mixture of alcohol and water. The wash solvent may comprise from 50 vol % solvent to 100 vol % alcohol; the alcohol may be methanol or ethanol.

DETAILED DESCRIPTION

A typical MIP can involve non-covalent bonding, such as hydrogen bonding between the polymer host and the target molecule, or can exploit other electrostatic forces in conjunction with shape recognition, but the procedure is not limited to these variants. When the MIP is formed in association with the target molecule and the target molecule is removed, it creates a MIP cavity that is complementary in shape and functionality to the target molecule, which can rebind a target identical to the original target. The polymer host also has solvent compatibility with the target molecule, and is capable of forming a binding cavity around the target molecule.

Crosslinked MIPs are produced using solution chemistry in organic solvents by combining monomers, crosslinkers, polymerization initiators, target molecules and/or homologs and analogs of target molecules according to prescribed methods disclosed herein. In this disclosure, a polymer host includes a structural component for a target analyte that is present during the formation of the MIP. For example, PVPP is a shape/size recognition polymer or structural component, ethylene dimethacrylate (EDMA) is a crosslinker and azobisisobutyronitrile (AIBN) may be used to initiate polymerization. Additional polymerization initiators that may be used include: halogen molecules, azo compounds, and organic peroxides.

In this disclosure, any number of crosslinkers may be used. The crosslinking monomer is a multifunctional molecule, comprising at least two polymerizable groups. In an embodiment, the crosslinking monomer comprises two polymerizable groups. In an embodiment, the crosslinker may be 2-(2-Methyl-acryloyloxy)ethyl 2-methyl-acrylate, referred to herein as ethylene dimethacrylate. Other names synonymous with ethylene dimethacrylate are methacrylic acid, ethylene ester; 1,2-bis(methacryloyloxy)ethane; 1,2-ethanediol dimethacrylate; diglycol dimethacrylate; ethanediol dimethacrylate; ethylene glycol bis(methacrylate); ethylene glycol dimethacrylate; and ethylene methacrylate. Other crosslinkers include, but are not limited to diethylene glycol dimethacrylate (DEGDMA) and triethylene glycol dimethacrylate (TEGDMA).

In this disclosure, the target analytes (also referred to as target molecules) may be in liquid form, either as a liquid or as one or more solids dissolved in liquid. The target molecules can include 2-isobutyl-3-methoxypyrazine (IBMP), 2-methoxypyrazine, 2-phenylethyl alcohol, guaiacol, or 4-methylguaiacol, odorants, tastants and tactile compounds, such as 2,4,6-trichloroanisole, 2-methylisoborneol, Geosmin (4,8a-dimethyldecalin-4a-ol), Methanethiol (methylmercaptan), Ethanethiol (ethylmercaptan), Dimethyl sulfide, Diethyl disulfide, Hydrogen sulfide, Acrolein (propenal), Acetic acid, Acetaldehyde, Amyl acetate, Diacetyl, Ethyl acetate, 4-ethylphenol, 4-ethylguaiacol, Vinyl-4-phenol, Isovaleric acid, 2-ethoxyhexa-3,5-diene, 2-acetyl-3,4,5,6-tetrahydropyridine, 2-acetyl-3,4,5,6-tetrahydropyridine, 2-ethyltetrahydropyridine, 2-acetyl-1-pyrrolene, Geraniol (3,7-Dimethylocta-2,6-diene-1-ol), Linalool (3,7-Dimethylocta-1,6-diene-3-ol), halogenated aromatics, trichlorophenol, tribromoanisole, 4,5-dichloroguaiacol, chlorovanillin, biogenic amines, histamine, tyramine, putrescine, phenylethylamine, Pronthocyanidins (a.k.a. condensed tannins), 4-aminoacetophenone, 1,1,6-trimethyl-1,2-dihydronaphthaline (TDN), 4-vinylguaiacol, cis-rose oxide, isopropylmethoxypyrazine, 2,3-butanedione, 3-hydroxybutanone, 2-mercaptoethanol, 1,1,6-trimethyl-1,2-dihydronaphthalene (TDN), $C_{13}$ norisoprenoid precursors of TDN (e.g. β-damascenone, β-ionone, vitispirane, actinidols, etc.), cis-3-Hexen-1-ol, 2-Methoxy-3,5-dimethylpyrazine and 2-secButyl-3-methoxypyrazine. In an embodiment, the target molecules include 2-isobutyl-3-methoxypyrazine, 2-methoxypyrazine, 2-phenylethyl alcohol, guaiacol, or 4-methylguaiacol.

Vinylidene chloride MIPs may be prepared by a technique in which the vinylidene chloride-based polymer is dissolved in a first solvent to form a first solution, a target molecule or target molecule analog is added to the first solution to form a second solution, the second solution is mixed to form a MIP network solution, a composition comprising the MIP and the target molecule or target molecule analog is recovered from the MIP network solution and the target molecule or target molecule analog is removed from the composition comprising the MIP and target molecule or target molecule analog. In an embodiment, the composition comprising the MIP and the target molecule or target molecule analog is recovered from the MIP network solution by precipitating the MIP network solution into a second solvent, and then filtering to recover the composition comprising the MIP and the target molecule or target molecule analog, The target molecule or target molecule analog may be removed by adding a third solvent to the recovered composition comprising the MIP and the target molecule or target molecule analog This disclosure describes a series of applications for the detection, extraction, purification and/or measurement of contaminants in wine samples using MIPs produced by the disclosed methods. In this disclosure various solvents can be used for the synthesis of, regeneration of, and extraction of various MIPs. Suitable solvents may be organic, aqueous or some mixture thereof. Appropriate solvents to use for synthesis depend upon the monomer used to produce a MIP and include, but are not limited to, for example, ethanol for P4VP and P4VP-PMMA MIPs, dimethylformamide for PU MIPs. methanol for PVPP and HEMA MIPs, and toluene for PMMA MIPs. In an embodiment the solvent for synthesis is a polar protic solvent. In an embodiment, the polar protic solvent used for synthesis is other than water.

The MIP materials are suitable for use as sensors that report the presence of the target analyte via, for example, a color change (either by a polymer incorporated chromophore, or an externally added reagent). Such a film can also be built into a capacitor to monitor dielectric changes due to the presence/absence of the target analyte. In an embodiment, films containing a polyelectrolyte, such as poly(amino acid), can be incorporated into a "chemiresistor" that monitors the presence of the analyte via conductivity changes.

MIP powders are useful for replacing generic SPE materials used in tubes as retention elements for liquid samples actively drawn through the tubes for a fixed period of time. In this case, the analytes adsorbed on the SPE materials can be extracted or placed directly into a sample port of an analytical technique including, for example, mass spectroscopy, gas chromatography, gas chromatography/liquid chromatography, high performance liquid chromatography, capillary electrophoresis, nuclear magnetic resonance spectroscopy, and various additional chromatographic spectroscopic techniques useful for subsequent separation and/or analysis.

SPE powders can also be used in a flow cell. For example, an SPE powder can be contained in the flow cell such that contaminated sample flows in, the contaminants are bound by the SPE powder, and a cleansed sample flows out that substantially lacks the target molecule. In another embodiment, SPE powders remove the target molecule and/or homologs/analogs thereof.

MIPs offer a significant advantage over generic SPE material because MIPs are designed to detect or remove a single contaminant, so that a separation phase prior to analysis is not necessary, and the amount extracted is simply quantified by a suitable analytical technique.

General Experimental Protocols

Alternative Production Methods:

Some MIPs compositions may also be precipitated by various precipitation means. If the polymer is a reactive polymer, some MIP compositions may be made by exposing the solution to ultraviolet light for precipitation. In some cases, it is also possible to precipitate the polymer by allowing the solvent to evaporate from the solution at room temperature while contained in a relatively flat holder. This method is ideal for producing a membrane, but can also be used to produce a granular solid that may be ground as described above.

Solid Phase Extraction: In an embodiment, the SPE process uses a single-tube processor sold by Sigma-Aldrich ("Guide to Solid Phase Extraction". Bulletin 910. [online] Sigma-Aldrich Co., 1998), although any processing system may be used once the MIP is placed in a separation column. The MIP may be added to an empty SPE tube with a loading of at least about 100 mg/mL of sample solution. The prepared tube is attached to the processor, the sample solution is added to the processor and constant vacuum is applied to draw the sample through the MIP, which binds the target specifically. In an embodiment, initial sample testing is a 10% ethanol and water solution spiked with about 20 ng/L of a target molecule. The binding capacity of the MIPs is typically of the order of 3 mg of template bound per 100 mg of MIP. The SPE-purified sample may then be analyzed quantitatively by GC-MS.

GC-MS Analysis of Target Molecules:

GC-MS analysis of 3-isobutyl-2-methoxypyrazine proceeded through methods well known in the art (D. M. Chapman, J. H. Thorngate, M. A. Matthews, J. X. Guinard and S. Ebeler, "Yield Effects on 2-Methoxy-3-Isobutylpyrazine Concentration in Cabernet Sauvignon Using A Sold Phase Microextraction Gas Chromatography/Mass Spectrometry Method", J. Agric. Food Chem., 52, 5431 (2004).; D. M. Chapman, G. Roby, S. Ebeler, J. X. Guinard and M. A. Matthews, "Sensory Attributes of Cabernet Sauvignon Wines Made from Vines with Different Water Status", Am. J. Enol. Vitic., 55, 325 (2004); Y. Kotseridis, R. Baumes and G. Skouroumounis, "Synthesis of Labelled [$^2H_4$]β-damascenone, [$^2H_2$]2-methoxy-3-isobutylpyrazine, [$^2H_3$]α-ionone and [$^2H_3$]β-ionone for Quantification in Grapes, Juices and Wines", J. Chromatogr. A, 824, 71 (1998; Y. Kotseridis, R. Baumes, A. Bertand and G. Skouroumounis, "Quantitative Determination of 2-methoxy-3-isobutylpyrazine in Red Wines and Grapes of Bordeaux Using a Stable Isotope Dilution Assay", J. Chromatogr. A, 841, 229 (1999)). Similar methods of analysis are available for other target molecules in various MIPs.

Specific Experimental Targets

MIPs have been produced with 3-isobutyl-2-methoxypyrazine as the target molecule by using 2-methoxypyrazine as an analog thereof. MIPs can be produced for any flavor component of wine that may be isolated in an analytical technique. The MIP, using these techniques, can employ a related molecule, such as 2-methoxypyrazine, rather than the target molecule itself, such as 3-isobutyl-2-methoxypyrazine. This is because the MIP involves chemical forces in addition to shape. Only a fragment of the target molecule (the fragment that interacts chemically with the polymer host) is required to effectively imprint the polymer. For example, IBMP is very persistent and requires considerable effort to remove from the originally produced MIP. 2-methoxypyrazine has been substituted for IBMP and produced a MIP from which template is easily removed by 50% aqueous ethanol and is extremely effective at sequestering IBMP. Moreover, the MIP is capable of removing all methoxypyrazines, including 2-isopropyl-3-methoxypyrazine, an unwanted component of wine, whose contaminative presence in wine is caused by populations of ladybugs that exist in and near the producing vineyards.

EXAMPLES

In Situ MIP Synthesis:

In an embodiment, provided herein is a method of making a molecularly imprinted polymer for extraction of at least one target molecule component of wine comprising:
mixing a solvent, a monomer and a target molecule to form a first solution; stirring said first solution; adding a cross linker to said stirred first solution to form a second solution; stirring said second solution for about 12 to about 18 hours; adding a polymerization initiator to said stirred second solution to form a third solution; heating the third solution; recovering a MIP polymer from said heated third solution; and
washing said MIP polymer with said solvent to remove said target molecule from said MIP polymer.

In another embodiment, the in situ MIP synthetic technique is as follows: first, add solvent, monomer and target molecule to create a first solution and stir the first solution for about 30 minutes; second, add crosslinker to first solution to form a second solution and stir for about 12 to 18 h; third, add polymerization initiator to the second solution to form a third solution, purge with nitrogen for 10 min, seal and heat the third solution in an oven at 60° C. for about 3 h; fourth, recover solid MIP that forms, wash in solvent until target molecule is removed; fifth, air dry and store MIP.

Synthesis of 2-methoxypyrazine imprinted poly(vinylpolypyrrolidone) (PVPP) for solid phase extraction of 3-isobutyl-2-methoxypyrazine from wine was carried out. In another embodiment, an alternative synthesis with poly (hydroxyethylmethacrylate) (HEMA) may also be used as a polymer. HEMA may be used in combination with a template for 3-isobutyl-2-methoxypyrazine or for guaiacol.

In an embodiment, the in situ MIP synthetic technique uses a 1 to 6.5 to 1 ratio of monomer to crosslinker to template, for example 2.5 g N-vinylpyrrolidone to 17 g ethylene dimethacrylate to 2.5 g 2-methoxypyrazine. (molar ratio of EGDMA to N-vinylpyrrolidone about 3.8:1) First, stir in functional monomer, for example 2.5 g of N-vinylpyrrolidone plus a target molecule in 100 mL methanol for 30 minutes at about room temperature, about 20° C. Next, add ethylene dimethacrylate and stir for 12 hours to 18 hours. Next, add 100 mg of AIBN to initiate polymerization. Next, purge with nitrogen for 10 min. Then seal and heat in a 60° C. oven for 3 h. In an embodiment, HEMA may be substituted for N-vinylpyrrolidone. Next, recover the solid MIP that forms, and wash with methanol or ethanol until the template molecule is removed. The resulting fine-powdered MIP may then be air dried and stored.

Use of In Situ MIP for Solid Phase Extraction:

In an embodiment, solid phase extraction of a wine-like sample with an MIP produced using the in situ MIP synthetic technique may be performed as follows: pack a solid phase extraction (SPE) tube with 1 g of MIP. The MIP may be PVPP cross linked with EDMA for the target molecule IBMP using 2-methoxypyrazine as an analog. Next, wash the MIP with at least about 200-300 mL of 50% ethanol/water. Next, add synthetic wine to the MIP SPE tube (synthetic wine may be comprised of 10% ethanol in water and further comprises the molecule to be removed. An extraction (e.g. with hexane) may occur prior to passage through the column. For example, 20 ng/L of 3-isobutyl-2-methoxypyrazine or guaiacol may be added to a 10% ethanol in water solution. Collect the flow through from the MIP SPE column. The organic layer may be concentrated and analyzed via gas chromatography/mass spectroscopy versus an internal standard (e.g. a deuterated IBMP internal standard). Using a solid phase micro-extraction (SPME) sampler, a head space sample may be collected after the addition of an internal standard and analyzed via gas chromatography/mass spectroscopy The results of using MIPs made by the in situ synthetic technique for SPE are as follows: Using a MIP made with NVP as the monomer for SPE reduces the concentration of 3-isobutyl-2-methoxypyrazine from 20 ng/L to about 0 ng/L. Using a MIP made with HEMA as the monomer for SPE reduces the concentration of 3-isobutyl-2-methoxypyrazine from 20 ng/L to 6 ng/L.

Repeated extraction of the above PVPP MIP for SPE of the synthetic wine sample (starting with 20 ng/L of 3-isobutyl-2-methoxypyrazine in the synthetic wine sample) produced the following results: after passing 100 mL through the MIP SPE column, the synthetic wine sample contained about 0 ng/L of 3-isobutyl-2-methoxypyrazine; 200 mL resulted in wine sample contained about 0 ng/L of 3-isobutyl-2-methoxypyrazine; 300 mL resulted in wine sample contained about 0 ng/L of 3-isobutyl-2-methoxypyrazine; 400 mL resulted in wine sample contained about 0 ng/L of 3-isobutyl-2-methoxypyrazine; 500 mL resulted in wine sample contained about 11 ng/L of 3-isobutyl-2-methoxypyrazine.

Repeated extraction of the above HEMA MIP for SPE of the synthetic wine sample (starting with 20 ng/L of 3-isobutyl-2-methoxypyrazine in the synthetic wine sample) produced the following results: after passing 100 mL through the MIP SPE column, the synthetic wine sample contained about 4 ng/L of 3-isobutyl-2-methoxypyrazine; 200 mL resulted in wine sample contained about 3 ng/L of 3-isobutyl-2-methoxypyrazine; 300 mL resulted in wine sample contained about 8 ng/L of 3-isobutyl-2-methoxypyrazine.

Regeneration of the MIP:

Either PVPP or the HEMA MIP SPE column's extraction activity may be regenerated by flushing the MIP SPE column with 100 mL of a 50% ethanol/water mixture. This wash returned the original extraction ability of the MIP.

An advantage to using the PVPP MIP SPE is that PVPP is already used in working with wine in the wine industry. PVPP is an approved material used in the processing of wine.

Another advantage over other MIPs produced by other methods is that the MIPs generated by the in situ MIP synthesis techniques disclosed herein is that the MIPs thus generated are robust, being able to extract through several cycles. They can be regenerated and reused according to the methods disclosed above.

MIPs, both using NVP and HEMA as a monomer, were constructed using prior techniques such as phase inversion MIP synthesis and monomer synthesized MIP production (without the crosslinking agent). These MIPs were tested with the MIP SPE column, as disclosed above, using the synthetic wine sample comprised of 10% ethanol in water with 20 ng/L of 3-isobutyl-2-methoxypyrazine added. These MIPs made using the phase inversion MIP synthesis and monomer synthesized MIP production did not extract as much 3-isobutyl-2-methoxypyrazine as the MIPs made using the in situ MIP synthetic technique.

Phase Inversion Synthesis of Poly(Vinylidene Chloride) Based MIPs

In an embodiment, the reagents are mixed in the ratio of 1 g of poly(vinylidene chloride) polymer 0.5 g of guaiacol and 15 mL of toluene. This mixture may be stirred for approximately twelve hours to develop the polymer-template network. At the end of the network formation period, the MIP is precipitated. This may be carried out by mixing the network solution into a solvent that precipitates the polymer. In different embodiments, the solvent used for dissolving the polymer may be a cycloketone such as cyclohexanone, cycoheptanone or cyclooctanone. For copolymers of vinylidene chloride and (meth)acrylate, suitable solvents include but are not limited to cycloketones or tetrahydrofuran (THF), dimethylformamide (DMF) and ethylacetate. Solvents suitable for precipitating the polymer may include, but are not limited to, water, hexane and diethyl ether. In an embodiment, the solvent used for precipitating the polymer is water. Soxhlet extraction with an appropriate solvent can be used to remove the template.

Having described several embodiments, it will be recognized by those skilled in the art that various modifications, alternative constructions, and equivalents may be used without departing from the spirit of the invention. Additionally, a number of well-known processes and elements have not been described in order to avoid unnecessary obscuring of the present invention. Accordingly, the above description should not be taken as limiting the scope of the invention. Those skilled in the art will appreciate that the presently disclosed instrumentalities teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

When a group of substituents is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

REFERENCES

1. L. Ye and K. Mosbach, "Molecular Imprinting: Synthetic Materials As Substitutes for Biological Antibodies and Receptors", Chem. Mater., 20, 859 (2008).
2. J. J. BelBruno, "Molecularly Imprinted Polymers: Artificial Receptors with Wide-Ranging Applications", Micro and Nanosystems, 1, 163 (2009).
3. G. Wulff, "Molecular Imprinting in Crosslinked Materials with the Aid of Molecular Templates-A way Towards Artificial Antibodies", Angew. Chem. Int. Ed., 34, 1812 (1995).
4. K. Mosbach and O. Ramstrom, "The Emerging Technique of Molecular Imprinting and its Future Impact on Biotechnology", Biotechnol., 14, 163 (1996).
5. K. J. Shea, "Molecular Imprinting of Synthetic Network Polymers: The DeNovo Synthesis of Macromolecular Binding and Catalytic Sites", Trends Polym. Sci., 2, 166 (1994).
6. K. Crabb, N. Shneskoff and J. J. BelBruno, "An Improved Molecularly Imprinted Polymer Film for Recognition of Amino Acids", J. Appl. Polym. Sci. 86, 3611 (2002).
7. A. Richter, U. J. Gibson, M. Nowicki and J. J. BelBruno, "Processing and Morphology of Molecularly Imprinted Nylon Thin Films", J. Appl. Polym. Sci, 101, 2919 (2006).
8. S. E. Campbell, M. Collins, Lie Xie, Lei and J. J. BelBruno "Surface Morphology of Spin-Coated Molecularly Imprinted Polymer Films", Surf. Interface Analy. 41, 347 (2009).
9. BelBruno et al., "Capacitive sensing of amino acids in molecularly imprinted nylon films," Sensors and Actuators B, 155 (2), July 2011, pp. 915-918.
10. P. Palaskova, J. Herszage and S. E. Ebeler, "Wine Flavor: Chemistry in a Glass", Chem. Soc. Rev., 37, 2478 (2008).
11. V. Schneider, "Aromatic and Phenolic Ripeness", [online] Schneider-Oenologie, Germany. [retrieved on 2013-10-14] Retrieved from the Internet: <URL: http://www.schneideroenologie.de/dnn/LinkClick.aspx?link=PDF%2FAromatic+and+Phe nolic+Ripeness.pdf&tabid=96&mid=527>.
12. "Guide to Solid Phase Extraction". Bulletin 910. [online] Sigma-Aldrich Co., 1998 [retrieved on 2013-10-14] Retrieved from the Internet: <URL: http://www.sigmaaldrich.com/Graphics/Supelco/objects/4600/4538.pdf>.
13. D. M. Chapman, J. H. Thorngate, M. A. Matthews, J. X. Guinard and S. Ebeler, "Yield Effects on 2-Methoxy-3-Isobutylpyrazine Concentration in Cabernet Sauvignon Using A Sold Phase Microextraction Gas Chromatography/Mass Spectrometry Method", J. Agric. Food Chem., 52, 5431 (2004).
14. D. M. Chapman, G. Roby, S. Ebeler, J. X. Guinard and M. A. Matthews, "Sensory Attributes of Cabernet Sauvignon Wines Made from Vines with Different Water Status", Am. J. Enol. Vitic., 55, 325 (2004).
15. Y. Kotseridis, R. Baumes and G. Skouroumounis, "Synthesis of Labelled $[^2H_4]\beta$-damascenone, $[^2H_2]$2-methoxy-3-isobutylpyrazine, $[^2H_3]\alpha$-ionone and $[^2H_3]\beta$-ionone for Quantification in Grapes, Juices and Wines", J. Chromatogr. A, 824, 71 (1998).
16. Y. Kotseridis, R. Baumes, A. Bertand and G. Skouroumounis, "Quantitative Determination of 2-methoxy-3-isobutylpyrazine in Red Wines and Grapes of Bordeaux Using a Stable Isotope Dilution Assay", J. Chromatogr. A, 841, 229 (1999).

What is claimed is:

1. A crosslinked molecularly imprinted polymer (MIP) for extraction of at least one target molecule component of wine, the MIP consisting essentially of polyvinylpolypyrrolidone (PVPP) molecularly imprinted to have specific affinity for binding with the target molecule component of wine, the target molecule component of wine being a flavor component, the PVPP being molecularly imprinted with 2-isobutyl-3-methoxypyrazine (IBMP), 2-methoxypyrazine, 2-phenyl ethyl alcohol, guaiacol or 4-methyl guaiacol.

2. The MIP of claim 1, wherein the PVPP is formed by polymerization of N-vinyl pyrrolidone with a crosslinker molecule.

3. The MIP of claim 2, wherein the molar ratio of crosslinker to monomer is in the range from 1.5:1 to 6:1.

4. The MIP of claim 2, wherein the crosslinker molecule is ethylene dimethacrylate.

5. The MIP of claim 1, wherein the MIP is in the form of particles having an average size from 100 nm to 1 micrometer.

6. The MIP of claim 5, wherein the particles have an average size from 100 nm to 500 nm.

7. The MIP of claim 1, wherein 1 g of the MIP is capable of removing 80-100% of the target molecule from 100 ml of wine or synthetic wine containing 20 ng/L of the target molecule.

8. The MIP of claim 7, wherein the MIP has been imprinted with 2-isobutyl-3-methoxypyrazine (IBMP), 2 methoxypyrazine or 2-phenyl ethyl alcohol, and the target molecule is IBMP.

9. The MIP of claim 7, wherein the MIP has been imprinted with guaiacaol or 4-methyl guaiacol, and the target molecule is guaiacaol.

10. A method comprising flowing wine through a solid phase extraction column comprising a solid phase comprising the MIP of claim 1.

11. The method of claim 10 further comprising the step of collecting the wine after it exits the solid phase extraction column.

12. The method of claim 10, wherein the wine comprises an initial concentration of a target molecule as it enters the solid phase extraction column, the wine comprises a final concentration of a target molecule as it exits the solid phase extraction column, and the ratio of the final concentration to the initial concentration of the target molecule is from 0 to 0.4.

13. The method of claim 12 wherein the ratio of the final concentration to the initial concentration of the target molecule is from 0 to 0.2.

14. A method of regenerating a MIP comprising washing the MIP of claim 1 with a solvent.

15. The method of claim 14 wherein the solvent comprises a mixture of an alcohol and water.

\* \* \* \* \*